United States Patent [19]
Aulbers et al.

[11] Patent Number: 5,157,836
[45] Date of Patent: Oct. 27, 1992

[54] TOOL FOR SEPARATING A CORE, A RIND AND FLESH OF A FRUIT, IN PARTICULAR A PINEAPPLE

[75] Inventors: Antonius P. Aulbers, Delft; Bernard W. Been, The Hague; Paul I. d'Hond, Zwijndrecht; Germán E. Knoppers, De Zweth, all of Netherlands

[73] Assignee: Chiquita Tropical Fruit Company, B.V., Zwijndrecht, Netherlands

[21] Appl. No.: 769,188

[22] Filed: Sep. 30, 1991

[30] Foreign Application Priority Data

Nov. 1, 1990 [NL] Netherlands ............. 9002385

[51] Int. Cl.$^5$ .................. A47J 25/00; B26B 3/00; B26B 3/04
[52] U.S. Cl. .................. 30/113.1; 30/130; 30/301; 30/302; 99/542; 99/544
[58] Field of Search .................. 99/538–545, 99/505, 515, 547, 593; 30/113.1, 113.3, 130, 128, 117, 300–302; 83/651.1

[56] References Cited

U.S. PATENT DOCUMENTS

| 166,013 | 7/1875 | Kimball | 30/302 |
|---|---|---|---|
| 188,819 | 3/1877 | Renner | 30/302 |
| 978,482 | 12/1910 | Petri | 30/302 |
| 1,516,683 | 11/1924 | Phare | 99/544 |
| 1,848,985 | 3/1932 | Yahn | 99/544 |
| 2,117,278 | 5/1938 | Ainsworth | 99/544 |
| 2,121,097 | 6/1938 | Polk et al. | 99/547 |
| 2,652,871 | 9/1953 | Botley et al. | |
| 3,128,810 | 4/1964 | Whipp | 99/547 |
| 3,540,503 | 11/1970 | McNair | 99/544 |
| 4,246,700 | 1/1981 | Coulon et al. | 99/545 |
| 4,457,222 | 7/1984 | Finkel | 99/538 |
| 4,690,047 | 9/1987 | Balzano | 99/542 |

FOREIGN PATENT DOCUMENTS

| 604657 | 10/1934 | Fed. Rep. of Germany . | |
| 1729914 | 7/1971 | Fed. Rep. of Germany . | |
| 9004107 | 8/1990 | Fed. Rep. of Germany . | |
| 0004817 | 10/1979 | PCT Int'l Appl. . | |
| 1253617 | 8/1986 | U.S.S.R. | 99/547 |

Primary Examiner—Timothy F. Simone
Attorney, Agent, or Firm—Fish & Richardson

[57] ABSTRACT

A tool is described for separating a core, a rind and flesh of a fruit, in particular a pineapple, including, at least, a cylindrical corer which is provided at one end with a cutting edge and at the other end with a handle or other driving member, such as a motor. In the tool there is provided, close to the cutting edge of the corer at least one flesh cutter extending radially thereon and provided with at least one cutting edge, the shape of the flesh cutter being chosen such that upon rotating of the tool, it executes a helical movement with a predetermined pitch, and in that at the end of the flesh cutter, opposite the end fixed to the corer, there is provided, at least locally, a rind cutter extending parallel to the corer and provided with at least one cutting edge. Further an auxiliary screw connected with the corer may be present to at least partially determine the pitch of the tool.

13 Claims, 4 Drawing Sheets

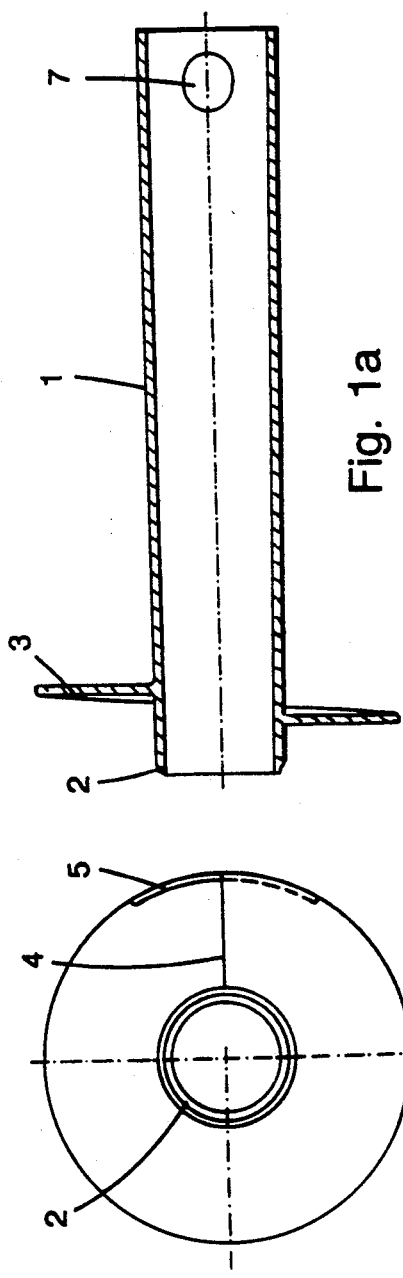
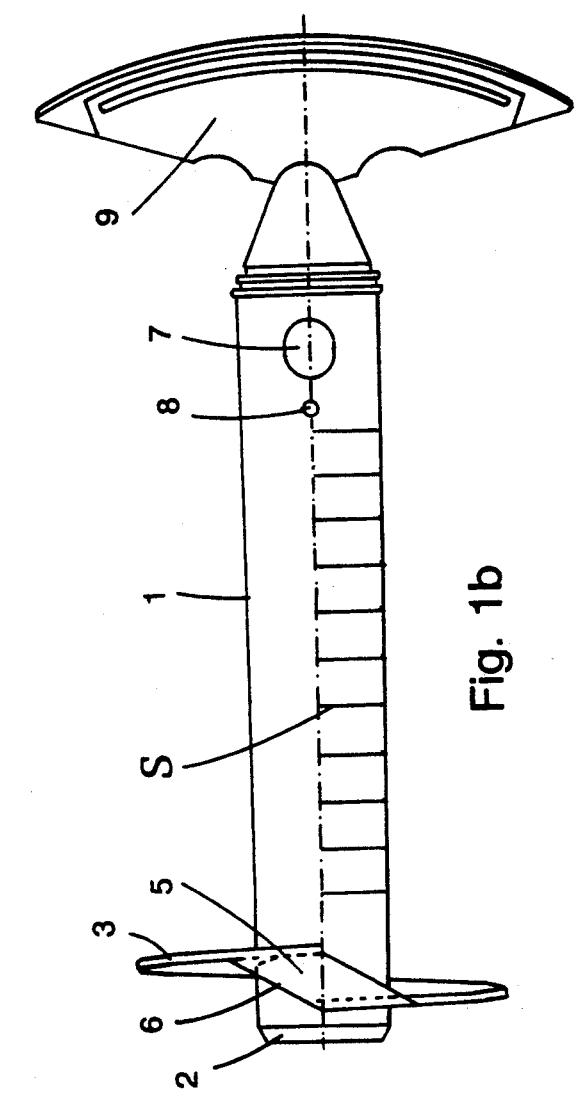

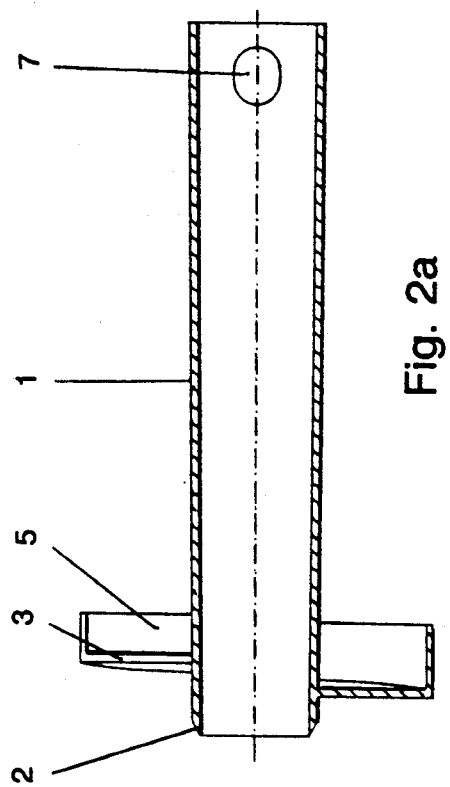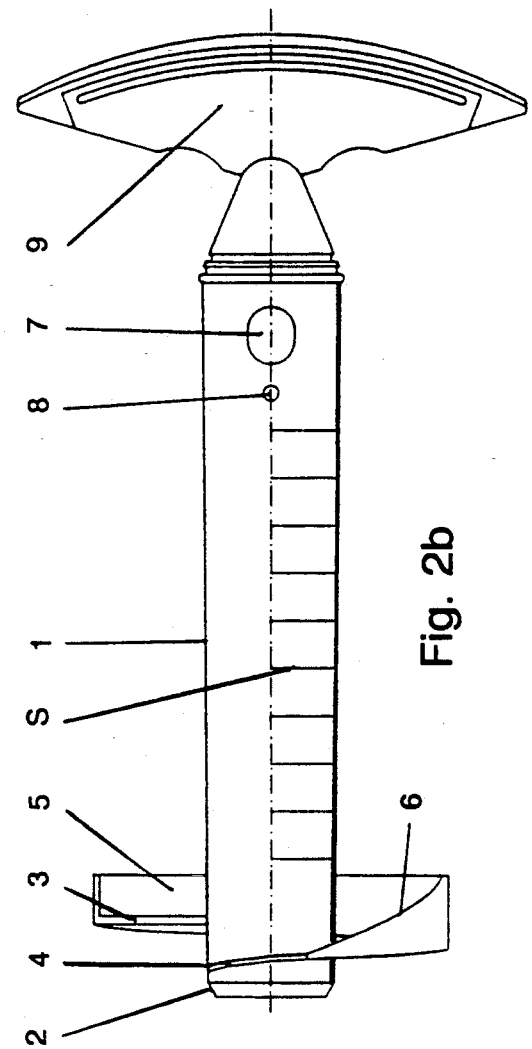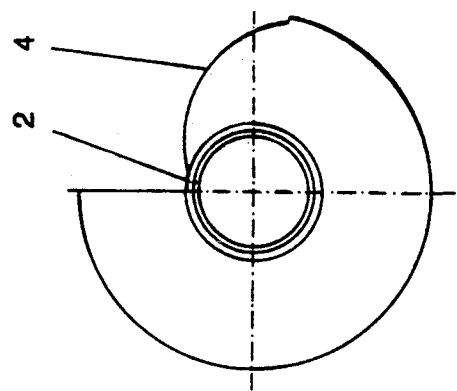

TOOL FOR SEPARATING A CORE, A RIND AND FLESH OF A FRUIT, IN PARTICULAR A PINEAPPLE

BACKGROUND OF THE INVENTION

The present invention relates to a tool for separating a core, a rind and flesh of a fruit, in particular a pineapple, comprising, at least, a cylindrical corer which is provided at one end with a cutting edge and at the other end with a handle or other driving member, such as a motor.

Such a tool is generally known and is described in e.g. U.S. Pat. No. 4,690,047. The tool described in this patent specification comprises, besides the cylindrical corer, a coaxial cylindrical member which is intended to separate the flesh from the rind. In order to use the tool, both ends have to be cut off the pineapple, following which the tool is driven into the remainder by a rotational or reciprocating movement. After the entire remainder is pierced, the rind and the core can be separated form the flesh. The flesh is then provided in the form of a cylinder for further processing.

This tool and the use thereof present a number of disadvantages. Firstly, both ends of the pineapple have to be removed, which precludes the use of the hollowed-out pineapple as e.g. a decorative dessert or serving bowl. It further results in the juice formed during the hollowing-out operation being lost and, for instance, running onto the working surface. Furthermore, the cylindrical flesh thus formed must afterwards be cut into slices or the like, which requires an additional operation and also a certain dexterity, so that attractive slices with the desired regular thickness are not always achieved. More juice is lost in the process. This tool thus presents disadvantages in domestic as well as industrial use.

SUMMARY OF THE INVENTION

The present invention seeks to provide a solution to the abovementioned disadvantages and to that end is characterized in that there is provided, close to the cutting edge of the corer, at least one flesh cutter extending radially thereon and provided with at least one cutting edge, the shape of the flesh cutter being chosen in such a manner that upon rotation of the tool, it executes a helical movement with a predetermined pitch, and in that at the end of the flesh cutter, opposite the end fixed to the corer, there is provided, at least locally, a rind cutter extending parallel to the corer and provided with at least one cutting edge.

The tool according to the present invention offers the following advantages in relation to the tool according to the state of the art. Only one end of the pineapple need be removed, preferably the crown, so that use as e.g. a dessert or serving bowl remains possible after hollowing out. Furthermore, the flesh is cut out helically, so that one lengthwise cut is sufficient to slice it, this cut, in addition, not being critical. For preparing chunks of flesh, more lengthwise cuts will be necessary, depending on the desired dimensions thereof. The lengthwise cut(s) is not required if a decorative spiral shape is desired. The juice formed during the hollowing-out operation remains inside the pineapple and is thus available for further use.

The tool according to the invention is suitable for domestic use as well as for industrial use in automatized operations, since the actions required for making slices are very simple and may in fact be carried out in one step. The canning industry especially may be considered in this connection.

It will, however, be clear that although reference is made exclusively to use in connection with fruit, pineapples in particular, the tool according to the invention is equally suitable for uses in which similar problems arise. That is, in all cases in which a core and an outer skin are to be separated from material present therebetween.

Further details and preferential embodiments of the tool according to the present invention are described in the subclaims.

In the following, the invention will be further clarified with reference to the accompanying drawing.

DESCRIPTION OF THE DRAWING

FIG. 1a, 1b and 1c show a lengthwise section, a side elevation and a bottom view, respectively, of an embodiment of the tool according to the present invention;

FIG. 2a, 2b and 2c show a lengthwise section, a side elevation and a bottom view, respectively, of a different embodiment of the tool according to the present invention;

DESCRIPTION OF THE PREFERRED EMBODIMENTS

Figure 3:
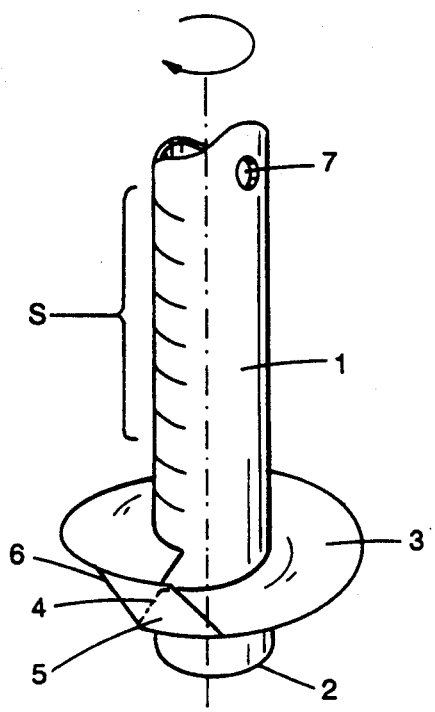
FIG. 3 shows a perspective view of the tool according to FIG. 1a-1c.

For the sake of clarity, the same reference numerals are used for the same parts throughout the figures.

FIG. 1a-c shows an embodiment of the tool according to the invention. The reference numeral 1 indicates a corer with a cutting edge 2. The flesh cutter is designated by the reference numeral 3 and comprises a cutting edge 4, which is visible only in FIG. 1c. The flesh cutter 3 extends helically and exactly fills a complete circle. The ends of the circle are interconnected by means of the rind cutter 5 with cutting edge 6. In this and the following figures, the cutting edges are depicted as sharpened edges. Obviously, serrations or different cutting edges may be used. The pitch of the flesh cutter 3 determines the slice thickness of the flesh cut out in this embodiment of the present invention.

The reference numeral 8 indicates an aperture in the corer 1 which is intended to prevent the drawing of a vacuum during the removal from the pineapple of the flesh cut out. Close to this opening there is provided a handle 9 which is fixed to the corer, cooperating to that end with a fixing aperture 7. Without a handle, the tool according to the present invention can be mounted in automatized industrial motor-driven machinery. In this case, a cutter must be provided for cutting the helically cut-out strip of flesh of the fruit in the lengthwise direction of the corer 1, thus forming slices. In addition, it may be advantageous if the flesh cutters are collapsible after cutting by disconnecting suitable hinge means between the corer 1 and the flesh cutters. This embodiment will be further clarified with reference to FIG. 6.

FIG. 2a-c show and embodiment in which the rind cutter 6 extends along the entire circumference of the flesh cutter 3. Here also, an aperture 8 as well as a handle 9 are provided in the corer.

FIG. 3 shows the embodiment according to FIG. 1 in perspective view. In this and the following figures, no handle has been shown for the sake of simplicity, and the direction of rotation is indicated by an arrow shown above the tool.

Furthermore, a scale S is provided on the corer 1 in this figure, which facilitates determining the bored depth and possibly the number of slices of flesh to be cut. It is thus possible, for instance, in the case of boring out a pineapple to place the tool next to the pineapple before boring and to read off the boring depth (number of slices). This prevents accidentally boring through the bottom of the pineapple.

Figure 4:
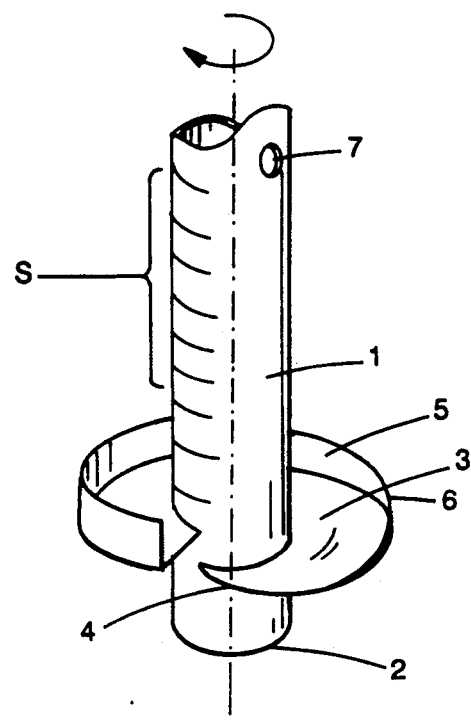
FIG. 4 shows a perspective view of the tool according to FIG. 2a-c.

FIG. 4 shows the embodiment according to FIG. 2 in perspective view, the corer 1 being provided with a scale S here also.

Figure 5:
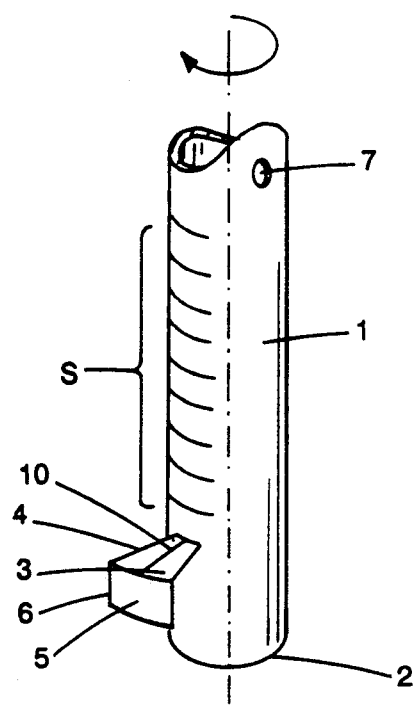
FIG. 5 shows a perspective view of a further embodiment of the tool according to the present invention.

FIG. 5 shows an embodiment which is also provided with a scale, and in which the pitch of the flesh cutter 3 is adjustable. The reference numeral 10 indicates a rotational axis around which the flesh cutter 3 with the rind cutter 5 fixed thereto may be rotated. The rotational action is advantageously such that the flesh cutter 3 can be fixed in position after rotation. A solution to this problem, given here by way of example, is the use of snap locks. Other solutions are obvious to the person skilled in the art.

The figure shows only a single flesh cutter 3, but it is advantageous to provide a similar flesh cutter 3 on the opposite side of the corer 1. Account is then to be taken of the pitch to be defined.

The flesh cutters may also be replaceable. For this, they do not have to be rotatable, since the pitch can then be determined by the choice of the flesh cutter which is in an appropriate helical plane.

It is noted that throughout the figures, the flesh cutters 3 are depicted perpendicular to the corer 1. However, it may be preferable, perhaps for decorative reasons, to vary the angle between the corer 1 and the flesh cutter 3, in order to provide e.g. more of less conical slices.

Figure 6:
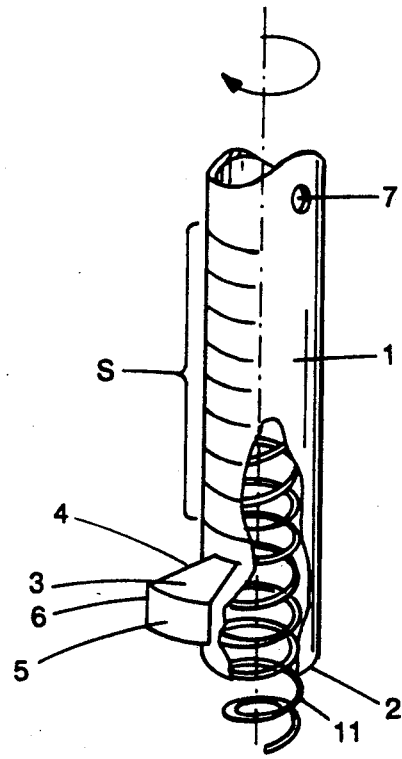
FIG. 6 shows a perspective view of yet a further embodiment of the tool according to the present invention provided with a helical spiral.

FIG. 6 shows an embodiment in which the pitch is not determined by the position of the flesh cutter 3, but also by an auxiliary screw 11 present in the corer 1. The auxiliary screw 11 has been depicted as shaped as a hollow corkscrew, but it will be obvious that it may also be provided in a different form. Thus, the corer 1 itself may be provided, internally and/or externally, with an auxiliary screw thread.

It is possible to provide a hinged connection between the flesh cutters 3 and the corer 1 and to provide the corer 1 with local recesses, so that the flesh cutters 3 are collapsible. This means that after cutting out the flesh and possibly making the cut in the lengthwise direction of the corer 1, the flesh cutters 3 can be collapsed into the recesses provided for that purpose. The slices can then easily be slid off the tool. It is also possible to make the handle removable, so that after the flesh has been cut out the handle can be removed and the flesh can be slid off the tool.

Figure 7:
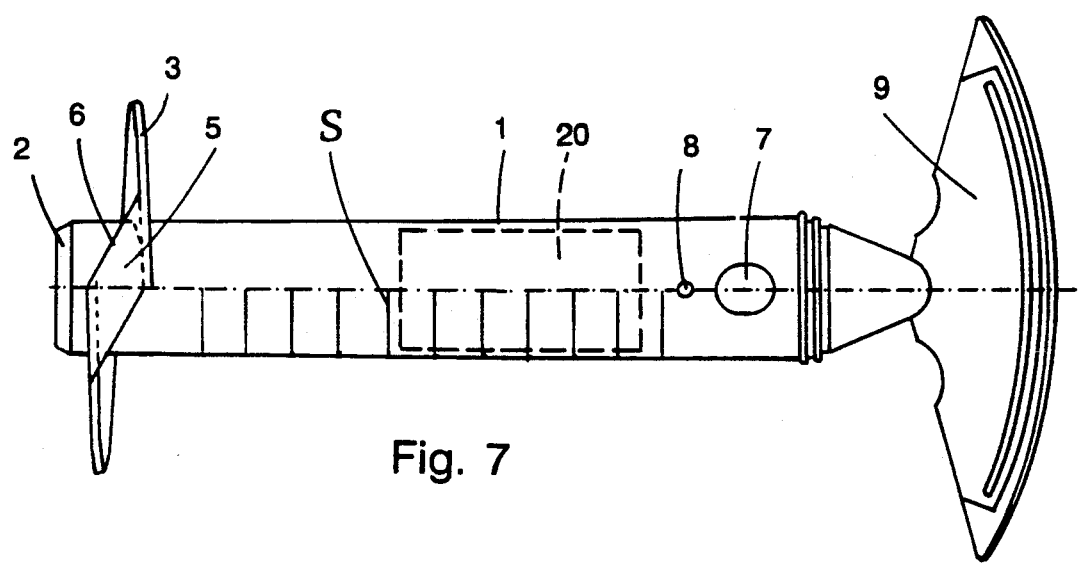
FIG. 7 shows a tool according to one embodiment of the invention, in which the tool contains an internal motor.

FIG. 7 shows a hand-held, motor-driven tool, similar to the tool shown in FIG. 1b, but further including an internal motor 20.

Figure 8:
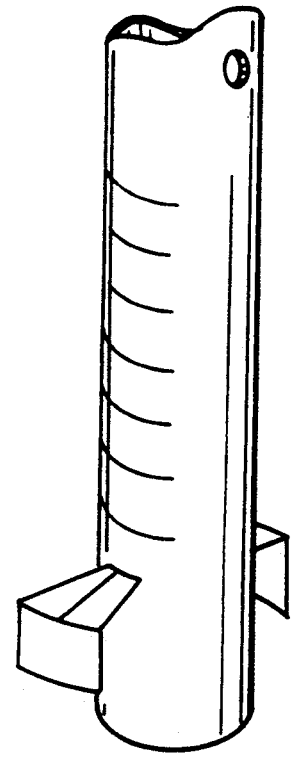
FIG. 8 shows a tool according to an alternate embodiment of the invention.

FIG. 8 shows a tool having two flesh cutters, one on either side of the flesh cutter. The flesh cutters are staggered in height and both define the same pitch.

Finally, it is to be noted that the flesh cutters 3 may be extendable, so that slices and pineapples of varying diameters may be bored.

What is claimed is:

1. A tool for separating a core, a rind and flesh of a fruit, in particular a pineapple, comprising an elongate cylindrical corer having a first end with a core cutting edge and a second, opposite end with a driving member for rotation of said tool within a fruit, wherein there is provided, close to said core cutting edge of the corer, at least one flesh cutter having a planar surface extending generally radially from said corer, with a first end at a surface of said corer, said planar surface provided with at least one leading flesh cutting edge, said planar surface in a region behind said leading flesh cutting edge being disposed at a predetermined incline, whereby upon rotation of said tool, said flesh cutter executes a helical movement through said flesh at a predetermined pitch, and said flesh cutter having a second end, opposite from said first end, where there is provided, at least locally, a rind cutter extending generally parallel to and spaced at a predetermined distance from said surface of said corer and provided with at least one rind cutting edge.

2. The tool according to claim 1, wherein there are provided two flesh cutters, one on either side of the corer, staggered in height, both of these defining the same pitch.

3. The tool according to claim 1, wherein only one helical flesh cutter defining a certain pitch is provided.

4. The tool according to claim 1, wherein the flesh cutter is provided, along the entire length of the sides thereof which face away from the corer, with a continuous rind cutter.

5. The tool according to claim 1, wherein there is provided in the corer, close to the handle or suchlike driving member, at least one aperture.

6. The tool according to claim 1, wherein there is provided a scale on the corer.

7. The tool according to claim 1, wherein the flesh cutters with the rind cutter fixed thereto are replaceable.

8. The tool according to claim 1, wherein the pitch of the flesh cutter is adjustable due to the fact that the flesh cutter is elongate and rotatable around lengthwise axis which is perpendicular to the corer, the rotation being adjustable.

9. The tool of claim 1 wherein said driving member is a handle.

10. The tool of claim 1 wherein said driving member is a motor.

11. A tool for separating a core, a rind and flesh of a fruit, in particular a pineapple, comprising an elongate cylindrical corer having a first end with a core cutting edge and a second, opposite end with a driving member for rotation of said tool within a fruit, wherein there is provided, close to said core cutting edge of the corer, at least one flesh cutter having a planar surface extending generally radially from said corer, with a first end at a surface of said corer, said planar surface provided with at least one leading flesh cutting edge, said planar surface in a region behind said leading flesh cutting edge being disposed at a predetermined incline, whereby upon rotation of said tool, said flesh cutter executes a helical movement through said flesh at a predetermined pitch, and said flesh cutter having a second end, opposite from said first end, where there is provided, at least locally, a rind cutter extending generally parallel to and spaced at a predetermined distance from said surface of said corer and provided with at least one rind cutting edge, wherein the pitch of the tool is at least partially determined by an auxiliary screw connected with the corer.

12. The tool according to claim 11, wherein the auxiliary screw is provided in the shape of a corkscrew and is fixed inside the corer.

13. The tool according to claim 11, wherein the auxiliary screw is provided internally or externally on the corer.

* * * * *